United States Patent
Zhang

(10) Patent No.: US 11,442,270 B2
(45) Date of Patent: Sep. 13, 2022

(54) VIRTUAL REALITY HEAD-MOUNTED APPARATUS WITH A PARTIAL-REFLECTION PARTIAL-TRANSMISSION WEDGE

(71) Applicant: ADVANCED NEW TECHNOLOGIES CO., LTD., Grand Cayman (KY)

(72) Inventor: Hong Zhang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 226 days.

(21) Appl. No.: 16/511,353

(22) Filed: Jul. 15, 2019

(65) Prior Publication Data

US 2019/0339527 A1 Nov. 7, 2019

Related U.S. Application Data

(63) Continuation of application No. PCT/CN2018/077285, filed on Feb. 26, 2018.

(30) Foreign Application Priority Data

Feb. 27, 2017 (CN) .......................... 201710109486.6

(51) Int. Cl.
*G02B 27/01* (2006.01)
*G06F 3/01* (2006.01)
(Continued)

(52) U.S. Cl.
CPC ......... *G02B 27/0172* (2013.01); *G06F 3/013* (2013.01); *G02B 27/0955* (2013.01);
(Continued)

(58) Field of Classification Search
CPC ...... G02B 2027/0138; G02B 2027/014; G02B 2027/0178; G02B 27/0093; G02B 27/0172; G02B 27/0955; G06F 3/013
See application file for complete search history.

(56) References Cited

U.S. PATENT DOCUMENTS

| | | | |
|---|---|---|---|
| 4,227,113 A | * | 10/1980 | Walsh ..................... H01K 1/18 313/112 |
| 5,347,400 A | | 9/1994 | Hunter |

(Continued)

FOREIGN PATENT DOCUMENTS

| | | |
|---|---|---|
| CN | 101077232 A | 11/2007 |
| CN | 200994790 Y | 12/2007 |

(Continued)

OTHER PUBLICATIONS

International Preliminary Report on Patentability Chapter I for PCT Application No. PCT/CN2018/077285 dated Sep. 6, 2019 (11 pages).

(Continued)

*Primary Examiner* — Bao-Luan Q Le

(57) ABSTRACT

Methods, systems, and apparatus for a virtual reality (VR) head-mounted apparatus are provided. One of the apparatus includes a convex lens, a camera and a partial-reflection partial-transmission lens. The partial-reflection partial-transmission lens is located on a side of the convex lens towards a user when the user wears the VR head-mounted apparatus, and a lens surface of the partial-reflection partial-transmission lens is disposed obliquely to reflect an infrared image of an eye of the user to the camera. The VR head-mounted apparatus improves the acquisition accuracy for an infrared image of an eye of the user.

20 Claims, 4 Drawing Sheets

(51) Int. Cl.
  *G02B 27/09* (2006.01)
  *G02B 27/14* (2006.01)
(52) U.S. Cl.
  CPC ...... *G02B 27/141* (2013.01); *G02B 2027/014* (2013.01); *G02B 2027/0138* (2013.01)

(56) References Cited

U.S. PATENT DOCUMENTS

| | | | |
|---|---|---|---|
| 5,621,424 A * | 4/1997 | Shimada | G02B 27/017 |
| | | | 345/8 |
| 5,689,619 A | 11/1997 | Smyth | |
| 5,771,124 A * | 6/1998 | Kintz | G02B 27/0101 |
| | | | 359/630 |
| 5,815,741 A * | 9/1998 | Okuyama | H04N 5/225251 |
| | | | 396/51 |
| 6,018,630 A * | 1/2000 | Arai | G03B 13/02 |
| | | | 396/51 |
| 6,043,799 A | 3/2000 | Tidwell | |
| 6,191,892 B1 * | 2/2001 | Isaka | G02B 27/017 |
| | | | 359/630 |
| 6,433,760 B1 | 8/2002 | Vaisie et al. | |
| 7,522,344 B1 * | 4/2009 | Curatu | G02B 27/0093 |
| | | | 359/634 |
| 8,482,859 B2 | 7/2013 | Border et al. | |
| 9,285,589 B2 | 3/2016 | Osterhout et al. | |
| 9,329,689 B2 | 5/2016 | Osterhout et al. | |
| 9,625,723 B2 * | 4/2017 | Lou | G02B 27/017 |
| 9,788,714 B2 | 10/2017 | Krueger | |
| 10,445,573 B2 * | 10/2019 | Wilson | H04N 5/247 |
| 10,485,420 B2 * | 11/2019 | Calpe Maravilla | G06T 7/13 |
| 10,488,917 B2 * | 11/2019 | Ollila | G06F 3/012 |
| 10,546,518 B2 * | 1/2020 | Perreault | G06T 3/40 |
| 10,627,627 B2 * | 4/2020 | Martinez | G02B 27/0093 |
| 10,788,677 B2 * | 9/2020 | Geng | G02B 27/143 |
| 10,788,892 B2 * | 9/2020 | Sharma | G06F 3/011 |
| 2001/0009478 A1 * | 7/2001 | Yamazaki | G02B 27/017 |
| | | | 359/630 |
| 2007/0058261 A1 | 3/2007 | Sugihara et al. | |
| 2008/0316606 A1 * | 12/2008 | Inoguchi | G02B 27/1066 |
| | | | 359/630 |
| 2010/0164990 A1 | 7/2010 | Doom | |
| 2010/0321409 A1 | 12/2010 | Komori et al. | |
| 2011/0043436 A1 | 2/2011 | Yamamoto | |
| 2011/0169730 A1 | 7/2011 | Sugihara | |
| 2012/0194418 A1 | 8/2012 | Osterhout et al. | |
| 2012/0249797 A1 | 10/2012 | Haddick et al. | |
| 2013/0107371 A1 | 5/2013 | Devaul | |
| 2014/0340286 A1 | 11/2014 | Machida et al. | |
| 2014/0361957 A1 * | 12/2014 | Hua | G06F 3/013 |
| | | | 345/8 |
| 2015/0009313 A1 * | 1/2015 | Noda | G06K 9/00604 |
| | | | 348/78 |
| 2015/0009574 A1 * | 1/2015 | Liesecke | G02B 27/0176 |
| | | | 359/630 |
| 2015/0242680 A1 * | 8/2015 | Thukral | G06F 3/013 |
| | | | 348/78 |
| 2015/0348327 A1 | 12/2015 | Zalewski | |
| 2016/0062121 A1 | 3/2016 | Border et al. | |
| 2016/0081547 A1 * | 3/2016 | Gramatikov | G01N 21/23 |
| | | | 351/210 |
| 2016/0180591 A1 | 6/2016 | Shiu et al. | |
| 2016/0291326 A1 * | 10/2016 | Evans | G02B 3/04 |
| 2016/0370591 A1 * | 12/2016 | Wilson | G02B 27/0179 |
| 2016/0378176 A1 | 12/2016 | Shiu et al. | |
| 2017/0115689 A1 | 4/2017 | Liu | |
| 2017/0140224 A1 * | 5/2017 | Wilson | G06K 9/00604 |
| 2017/0147859 A1 * | 5/2017 | Zhang | G06F 3/0304 |
| 2017/0176749 A1 | 6/2017 | Ouderkirk et al. | |
| 2017/0205876 A1 * | 7/2017 | Vidal | G06F 1/163 |
| 2017/0214905 A1 | 7/2017 | Wu | |
| 2017/0262703 A1 * | 9/2017 | Wilson | G02B 27/017 |
| 2017/0285337 A1 * | 10/2017 | Wilson | G02B 27/01 |
| 2017/0285736 A1 * | 10/2017 | Young | G06F 3/013 |
| 2017/0287112 A1 * | 10/2017 | Stafford | G06F 3/013 |
| 2017/0287446 A1 * | 10/2017 | Young | G06F 3/013 |
| 2018/0068449 A1 * | 3/2018 | Malaika | G06T 7/277 |
| 2018/0157320 A1 * | 6/2018 | Trail | G06F 3/011 |
| 2018/0203505 A1 * | 7/2018 | Trail | G02B 27/0093 |
| 2018/0239423 A1 * | 8/2018 | Mardanbegi | A61B 3/113 |
| 2018/0330652 A1 * | 11/2018 | Perreault | H04N 5/22541 |
| 2019/0101757 A1 * | 4/2019 | Martinez | G06F 3/013 |
| 2019/0101767 A1 * | 4/2019 | Geng | G02B 27/0172 |
| 2019/0113968 A1 * | 4/2019 | Huang | G06K 9/00335 |
| 2019/0258314 A1 * | 8/2019 | Ollila | G02B 27/0172 |
| 2019/0361523 A1 * | 11/2019 | Sharma | G02B 27/0955 |
| 2020/0379561 A1 * | 12/2020 | Sharma | G06T 19/006 |

FOREIGN PATENT DOCUMENTS

| | | |
|---|---|---|
| CN | 202198569 U | 4/2012 |
| CN | 104407440 A | 3/2015 |
| CN | 205103761 U | 3/2016 |
| CN | 105718046 A | 6/2016 |
| CN | 105955491 A | 9/2016 |
| CN | 205721634 U | 11/2016 |
| CN | 106214118 A | 12/2016 |
| CN | 106406509 A | 2/2017 |
| CN | 106406543 A | 2/2017 |
| CN | 205942608 U | 2/2017 |
| CN | 106908951 A | 6/2017 |
| CN | 206584118 U | 10/2017 |
| DE | 202016104179 U1 | 8/2016 |
| JP | H06-121254 A | 4/1994 |
| JP | H11-249588 A | 9/1999 |
| KR | 1020160143749 A | 12/2016 |
| TW | 201608281 A | 3/2016 |
| WO | 2009/150747 A1 | 12/2009 |
| WO | 20150157016 A1 | 10/2015 |
| WO | 20150198502 A1 | 12/2015 |

OTHER PUBLICATIONS

Office Action and Search Report for Taiwanese Application No. 106139871 dated Oct. 22, 2018 (7 pages).
Written Opinion of the International Searching Authority and International Search Report for PCT Application No. PCT/CN2018/077285 dated May 25, 2018 with partial English translation (12 pages).
First Office Action and First Search for Chinese Application No. 201710109486.6 dated Oct. 17, 2018 (5 pages).
Second Office Action for Chinese Application No. 201710109486.6 dated Jun. 28, 2019 with machine English translation (12 pages).
Search Report for European Application No. 18758081.6, dated Jan. 8, 2020, 4 pages.
Examination Report for European Application No. 18758081.6, dated Jan. 20, 2020, 5 pages.
Written Opinion for Singapore Application No. 11201906874W, dated Apr. 7, 2020, 8 pages.
Office Action for Korean Application No. 10-2019-7022644 dated Nov. 3, 2020.
Office Action for Japanese Application No. 2019-546360 dated Oct. 27, 2020.
Notice of Allowance for Korean Application No. 10-2019-7022644 dated May 9, 2021.

* cited by examiner

VIRTUAL REALITY HEAD-MOUNTED APPARATUS WITH A PARTIAL-REFLECTION PARTIAL-TRANSMISSION WEDGE

CROSS-REFERENCE TO RELATED APPLICATION

This application is a continuation application of International Patent Application No. PCT/CN2018/077285, filed on Feb. 26, 2018, which is based on and claims priority of the Chinese Patent Application No. 201710109486.6, filed on Feb. 27, 2017 and entitled "VIRTUAL REALITY HEAD-MOUNTED APPARATUS." The above-referenced applications are incorporated herein by reference in their entirety.

TECHNICAL FIELD

This application relates generally to virtual reality (VR) technology, and more specifically, to a VR head-mounted apparatus.

BACKGROUND

VR technology uses a computer graphics system and various control interfaces to generate an interactive environment on a computer and thus provides three-dimensional immersive scenes for a user. Existing technologies may create VR experience through a VR head-mounted apparatus, such as VR glasses or a VR helmet.

However, due to unique characteristics of VR technology, technical solutions that may work on traditional electronic devices, such as mobile phones or PCs, may not work well on a VR apparatus. For example, when acquiring an infrared image of an eye of a user wearing a VR apparatus, image acquisition conditions for conventional methods may be difficult to satisfy due to structural constraints within the VR apparatus, resulting in difficulties to successfully complete tasks such as biometric recognition, eye tracking, etc. Therefore, a VR apparatus that can quickly and accurately acquire an image of an eye of a user is desired.

SUMMARY

In view of the limitations of existing technologies described above, this application provides a VR head-mounted apparatus. The apparatus may provide improved acquisition accuracy for an infrared image of an eye of a user wearing the VR apparatus.

A first aspect of this specification provides a VR head-mounted apparatus. The VR head-mounted apparatus disclosed herein may comprise a convex lens, a first camera and a partial-reflection partial-transmission lens for reflecting infrared light. The partial-reflection partial-transmission lens may be located on a side of the convex lens towards a user when the user wears the VR head-mounted apparatus, and a lens surface of the partial-reflection partial-transmission lens may be disposed obliquely to reflect an infrared image of an eye of the user to the first camera.

In some embodiments, the partial-reflection partial-transmission lens may have a high transmittance for visible light and a low transmittance for infrared light.

In some embodiments, the partial-reflection partial-transmission lens may include an infrared dichroic mirror.

In some embodiments, the infrared dichroic mirror may comprise a TiO2-Ag—TiO2 infrared reflective film or a ZnS—Ag—ZnS infrared reflective film.

In some embodiments, the first camera may be located outside a visible area of the convex lens with respect to the user.

In some embodiments, the partial-reflection partial-transmission lens may have a plate shape, the lens surface of the partial-reflection partial-transmission lens may be inclined upward, the first camera may be located at a top of the apparatus, and a lens of the first camera may face downward. Alternatively, the lens surface of the partial-reflection partial-transmission lens may be inclined downward, the first camera may be located at a bottom of the apparatus, and a lens of the first camera may face upward.

In some embodiments, the partial-reflection partial-transmission lens may have a wedge-shaped cross section, a back surface of the partial-reflection partial-transmission may be disposed vertically, the lens surface of the partial-reflection partial-transmission lens is inclined downward, the first camera may be located at a bottom of the apparatus, and a lens of the first camera may face upward.

In some embodiments, the partial-reflection partial-transmission lens may include an upper lens structure and a lower lens structure disposed obliquely, and a joint of the upper lens structure and the lower lens structure may be located in the middle of the partial-reflection partial-transmission lens. The apparatus may further include a second camera, the first camera may be located at a top of the apparatus with a lens of the first camera facing the upper lens structure, and the second camera may be located at the bottom of the apparatus with a lens of the second camera facing the lower lens structure.

In some embodiments, the upper lens structure and the lower lens structure may be symmetrical with respect to a horizontal plane going through the middle of the partial-reflection partial-transmission lens.

In some embodiments, the partial-reflection partial-transmission lens may include an upper lens structure and a lower lens structure disposed obliquely, and a joint of the upper lens structure and the lower lens structure may be located at an upper part of the partial-reflection partial-transmission lens. The apparatus may further comprise a second camera. The first camera may be located at a top of the apparatus and a lens of the first camera may face the upper lens structure, and the second camera may be located at a bottom of the apparatus and a lens of the second camera may face the lower lens structure.

In some embodiments, the apparatus may further include a protective frame, which may form an accommodating space adapted to the partial-reflection partial-transmission lens and the convex lens, so as to accommodate and fix the partial-reflection partial-transmission lens and the convex lens to the apparatus.

In some embodiments, the apparatus may further include an adjustment component, configured to perform angle adjustment on the first camera, such that the lens of the first camera may be kept towards a virtual infrared image of the eye formed by the partial-reflection partial-transmission lens.

According to a second aspect, this specification provides a VR head-mounted apparatus. The VR head-mounted apparatus comprises a convex lens, a camera, and a partial-reflection partial-transmission lens for reflecting infrared light. The partial-reflection partial-transmission lens may be located on a side of the convex lens towards a user when the user wears the VR apparatus, and a lens surface of the partial-reflection partial-transmission lens may be disposed obliquely to reflect an infrared image of an eye of the user to the camera. The VR head-mounted apparatus may further include a VR playing component on a side of the convex lens away from the user and configured to display VR content.

In some embodiments, the VR playing component may be a mobile phone or a tablet, and the VR content may be displayed through a screen of the VR playing component.

In some embodiments, the VR playing component may be a display component connected to an external apparatus, which may generate the VR content for the VR playing component to display.

In some embodiments, the external apparatus may be a personal computer or a game console.

In some embodiments, the partial-reflection partial-transmission lens may have a high transmittance for visible light and a low transmittance for infrared light.

In some embodiments, the partial-reflection partial-transmission lens may include an infrared dichroic mirror.

In some embodiments, the infrared dichroic mirror may include a TiO2-Ag—TiO2 infrared reflective film or a ZnS—Ag—ZnS infrared reflective film.

The VR head-mounted apparatus of this application may comprise a partial-reflection partial-transmission lens, and a lens surface of the partial-reflection partial-transmission lens may be disposed obliquely. Therefore, without interfering with a user's viewing of VR display content, an infrared image of an eye of the user may be reflected to a camera by the partial-reflection partial-transmission lens, and a deviation angle of a camera during the acquisition of the infrared image of the eye may be reduced. The VR head-mounted apparatus may reduce the deformation and distortion, and improves the acquisition accuracy of the infrared image of the eye.

DETAILED DESCRIPTION OF THE EMBODIMENTS

Specific, non-limiting embodiments of the present invention will be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Using a VR helmet as an example, detail structures of a VR head-mounted apparatus of this application are described below through several embodiments.

Figure 1:
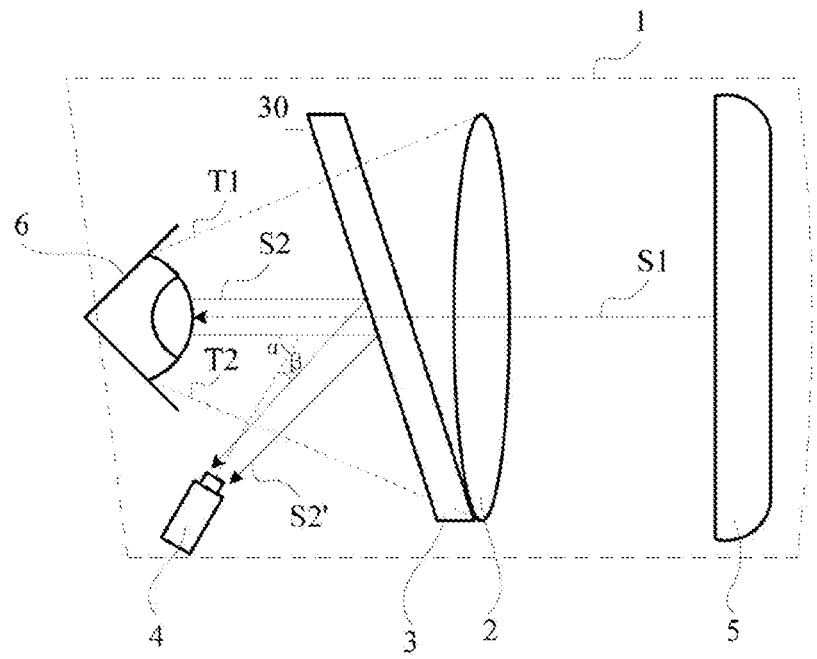
FIG. 1 is a side cross-sectional view of a VR helmet in accordance with a first embodiment of this application.

FIG. 1 is a side cross-sectional view of a VR helmet in accordance with one embodiment of this application. As shown in FIG. 1, the VR helmet 1 may include a convex lens 2 and a VR playing component 5. The VR helmet 1 may further include a partial-reflection partial-transmission lens 3 for reflecting infrared light. The partial-reflection partial-transmission lens 3 may be located on a side of the convex lens 2 towards a user when the user wears the VR helmet 1 (i.e., the partial-reflection partial-transmission lens 3 may be located between the convex lens 2 and an eye 6 of the user). The partial-reflection partial-transmission lens 3 may have a high transmittance for visible light (relative to infrared light) and a low transmittance for infrared light (relative to visible light). Thus, VR display content played by the VR playing component 5 may, in a form of visible light S1, go through the partial-reflection partial-transmission lens 3 almost unaffected, and the eye 6 of the user may receive the visible light S1 to view the VR display content. On the other hand, infrared light S2 emitted from the eye 6 of the user may be mostly, if not entirely, reflected by the partial-reflection partial-transmission lens 3. The reflected infrared light S2' may be acquired by a camera 4 in the VR helmet 1, and an infrared image of the eye 6 may be formed from the reflected infrared light S2' for functions such as eye tracking and iris recognition.

More specifically, a lens surface 30 of the partial-reflection partial-transmission lens 3 may be disposed obliquely. Positions of the partial-reflection partial-transmission lens 3 and the camera 4 may correspond to each other, so that the lens surface 30 of the partial-reflection partial-transmission lens 3 can reflect the infrared light S2 corresponding to the infrared image of the eye 6 towards the camera 4. For example, in the embodiment shown in FIG. 1, the camera 4 may be located at a lower edge of the VR helmet 1, and located at a side of the convex lens 2 towards the user (i.e., the left side of the convex lens 2, as shown in FIG. 1). A lens of the camera 4 may face inward towards the partial-reflection partial-transmission lens 3 to acquire the foregoing reflected infrared light S2'. Assuming that an angle between the camera 4 and the infrared light S2 is maintained at a, since the lens surface 30 of the partial-reflection partial-transmission lens 3 may be disposed obliquely to reflect the infrared light S2 towards the camera 4 to form the reflected infrared light S2', an angle β between the camera 4 and the reflected infrared light S2' may be smaller than the foregoing angle α. Thus possible deformation and distortion of the infrared image of the eye acquired by the camera 4 due to large angle α may be reduced, which helps to improve the acquisition accuracy for the infrared image of the eye 6, and to further improve the accuracy and precision of subsequent processing such as iris recognition and eye tracking.

Moreover, since the size of the eye 6 of the user tends to be smaller than the size of the aperture of the convex lens 2, a visible area formed between the eye 6 and the convex lens 2 may have a trapezoidal shape as shown in FIG. 1 (in 3-D space, the visible area may have a cone shape since the convex lens 2 is round). A top surface and a bottom surface of the VR helmet 1 (i.e., illustrated as a top side and a bottom side of the dashed box shown in FIG. 1) may both be planar. In an example that the camera 4 is located inside the bottom surface of the VR helmet 1 (as shown in FIG. 1), an installation space for the camera 4 may become smaller as the camera moves closer to the convex lens 2, and become larger as the camera moves closer to the eye 6. Thus, when the camera 4 is installed close to the eye 6 (e.g., installed at a position as shown in FIG. 1), a larger installation space (compared to a situation where the installation position of the camera 4 is close to the convex lens 2) can be obtained to adjust an installation angle of the camera 4 (e.g., to make it more parallel with the reflected infrared light S2') and to reduce the foregoing angle (3, thereby improving the acquisition accuracy of the camera 4 for the infrared image of the eye 6.

The technical solutions of this application may be applied to any type of VR head-mounted apparatus. For example, as shown in FIG. 1, the VR helmet may be an integrated-style VR head-mounted apparatus, that is, the VR helmet may be able to independently play VR content without resorting to an external apparatus. The VR playing component 5 may be built-in in the VR helmet 1 to implement playing functions such as rendering and displaying of VR display content. Alternatively, the VR helmet 1 may be a split-style VR head-mounted apparatus. In one example, the VR helmet 1 may be paired with a mobile apparatus such as a mobile phone or a tablet. The VR playing component 5 may include a mobile apparatus installed in the VR helmet 1, and the mobile apparatus may use a processor or a graphic card chip for rendering VR display content, and use a screen component for content display. In another example, the VR helmet may be paired with a PC host, a game console, or another external apparatus. The VR playing component 5 may be a display component built-in in the VR helmet, and the foregoing external apparatus may be used for rendering VR display content.

In the embodiments of this application, the partial-reflection partial-transmission lens 3 for reflecting infrared light may refer to a lens having a low transmittance for an infrared spectrum and a high transmittance for other spectra such as visible light. Most, if not all, of light in the low-transmittance infrared spectrum may be reflected by the partial-reflection partial-transmission lens 3 (i.e., "partial-reflection"). Meanwhile, most, if not all, of light in other spectra such as high-transmittance visible light may pass through the partial-reflection partial-transmission lens 3 almost unaffected, so that the partial-reflection partial-transmission lens 3's impact on light in other spectra, such as visible light, can be minimized (i.e., "partial-transmission").

In some embodiments, the foregoing partial-reflection partial-transmission lens 3 for reflecting infrared light may be an infrared dichroic mirror, such that light in a visible spectrum may be mostly, if not completely, transmitted and light in an infrared spectrum may be mostly, if not completely, reflected. More specifically, in one embodiment, an infrared reflective film such as a TiO2-Ag—TiO2 infrared reflective film or a ZnS—Ag—ZnS infrared reflective film may be coated on a surface of an optical lens that has a high transmittance for visible light to form the infrared dichroic mirror. In another embodiment, a lens may be made entirely of materials in the foregoing infrared reflective film or a similar preparation material to form the infrared dichroic mirror.

In this application, the VR head-mounted apparatus comprises a partial-reflection partial-transmission lens 3, and a lens surface 30 of the partial-reflection partial-transmission lens 3 may be obliquely disposed. Without interfering with a user's viewing of VR display content, an infrared image of an eye of the user may be reflected to a camera by the partial-reflection partial-transmission lens 3. A deviation angle of a camera 4 during the acquisition of the infrared image of the eye may be reduced, which reduces the deformation and distortion of the infrared image of the eye, and improves the acquisition accuracy of the infrared image of the eye.

Figure 2:
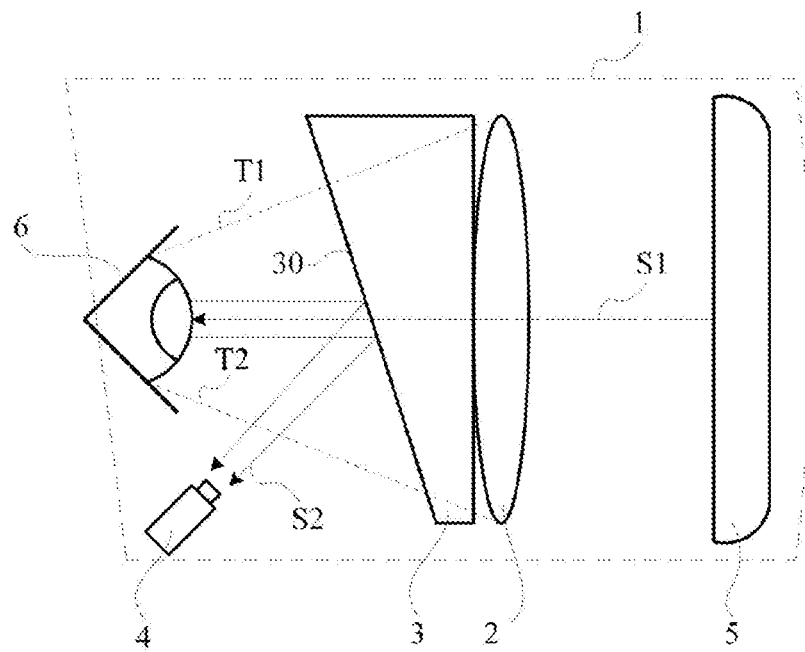
FIG. 2 is a side cross-sectional view of a VR helmet in accordance with a second embodiment of this application.

The partial-reflection partial-transmission lens 3 in this specification may have a plate shape as shown in FIG. 1. In that case, the partial-reflection partial-transmission lens 3 as a whole may be arranged obliquely, as shown in FIG. 1. In some embodiments, the partial-reflection partial-transmission lens 3 may have other shapes, and may be arranged in other manners. For example, as shown in FIG. 2, the partial-reflection partial-transmission lens 3 may have a wedge-shaped cross section. In that case, a back surface of the partial-reflection partial-transmission lens 3 (a surface of the partial-reflection partial-transmission lens facing the convex lens 2) may be disposed vertically, so that the lens surface 30 of the partial-reflection partial-transmission lens may be disposed inclined. For example, as shown in FIG. 2, the lens surface 30 of the partial-reflection partial-transmission lens 3 may be inclined downward. This arrangement may reduce the installation difficulty of the partial-reflection partial-transmission lens 3 as the installation angle of the partial-reflection partial-transmission lens 3 does not need to be repeatedly adjusted.

In the embodiment shown in FIG. 1 or FIG. 2, the lens surface 30 of the partial-reflection partial-transmission lens 3 is inclined downward, the camera 4 is located at the bottom of the VR helmet 1, and the lens of the camera 4 may face upward. Due to the structural characteristics of a human eye, the infrared image of the eye 6 of the user can be acquired more completely, clearly and accurately under this setting. In the embodiment shown in FIG. 3, the lens surface 30 of the partial-reflection partial-transmission lens 3 is inclined upward, the camera 4 is located at the top of the VR helmet 1, and the lens of the camera 4 may face downward, the infrared image of the eye 6 can also be obtained.

Figure 3:
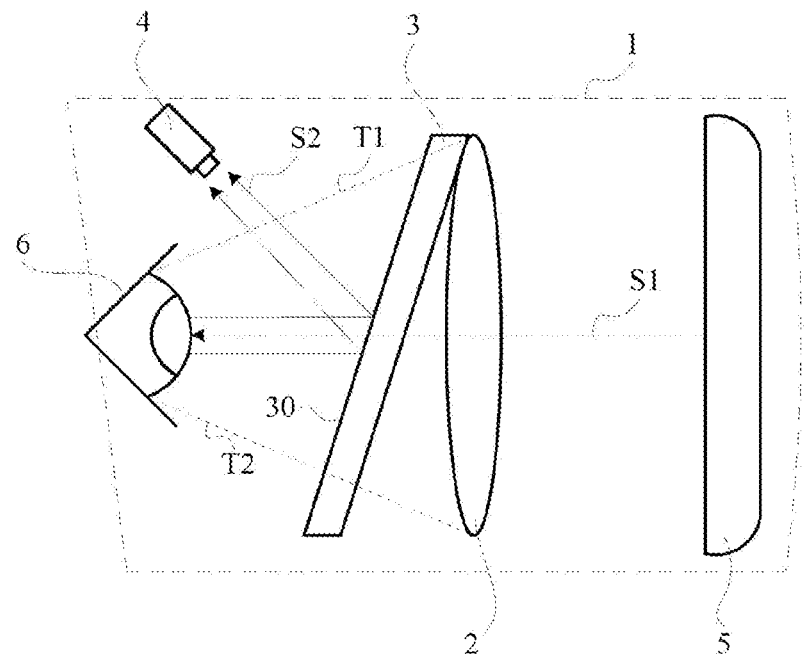
FIG. 3 is a side cross-sectional view of a VR helmet in accordance with a third embodiment of this application.
Figure 4:
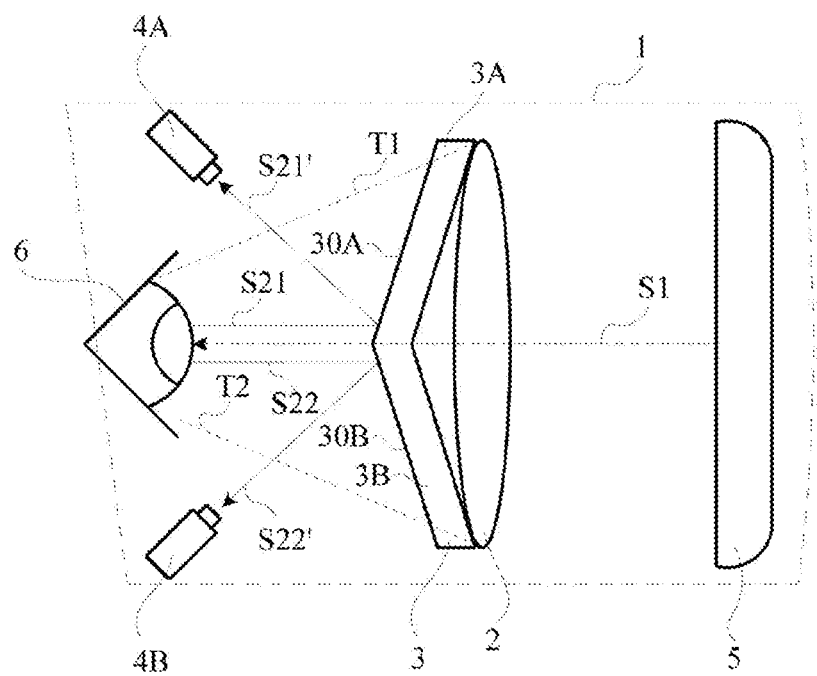
FIGS. 4, 5, and 6 are side cross-sectional views of a VR helmet in accordance with a fourth embodiment of this application.

FIG. 4 is a side cross-sectional view of a VR helmet in accordance with one embodiment of this application. As shown in FIG. 4, in addition to the foregoing plate shape as shown in FIGS. 1-3, the partial-reflection partial-transmission lens 3 may have other shapes. For example, the partial-reflection partial-transmission lens 3 in FIG. 4 may include an upper lens structure 3A and a lower lens structure 3B each disposed obliquely, and a joint of the upper lens structure 3A and the lower lens structure 3B may be located in the middle of the partial-reflection partial-transmission lens (i.e., in the embodiment shown in FIG. 4, the upper lens structure 3A may incline rightward, and the lower lens structure 3B may incline leftwards).

In some embodiments, the VR helmet 1 may include two cameras, as shown in FIG. 4. That is, the VR helmet 1 may include a first camera 4A and a second camera 4B. The first camera 4A may be located at a top of the VR helmet 1 with a lens of the first camera 4A facing the upper lens structure 3A, and the second camera 4B may be located at a bottom of the VR helmet 1 with a lens of the second camera 4B facing the lower lens structure 3B.

Since users wearing the VR apparatus may have different shapes and sizes on traits such as their heads, faces and eyes, and the VR apparatus may be uniformly manufactured by a manufacturer, a positional relationship between the eye 6 and the partial-reflection partial-transmission lens 3 may be different for different users wearing a same VR apparatus. For example, the eye 6 may not be exactly located in a middle position of the VR helmet 1 as shown in FIGS. 1-3, which may result in the camera 4 not being able to completely acquire the infrared image of the eye of the user.

To address the foregoing deficiency, the VR head-mounted apparatus presented in FIG. 4 can ensure that infrared images of the eyes of a user can be completely acquired by the first camera 4A and the second camera 4B, regardless the positional changes (e.g., an upward shift or a downward shift) that may occur to the eyes of the user.

For example, when the eye 6 is located near the middle position of the VR helmet 1, an upper region of the infrared image of the eye 6 may correspond to a first infrared ray S21, and a lower region of the infrared image of the eye 6 may correspond to a second infrared ray S22. The first infrared ray S21 may be reflected by an upper lens surface 30A of the upper lens structure 3A to form a first reflected infrared ray S21', which may be acquired by the first camera 4A. The second infrared ray S22 may be reflected by a lower lens surface 30B of the lower lens structure 3B to form a second reflected infrared ray S22', which may be acquired by the second camera 4B. Then, the first reflected infrared ray S21' and the second reflected infrared ray S22' may be combined to form the infrared image of the eye 6.

Figure 5:
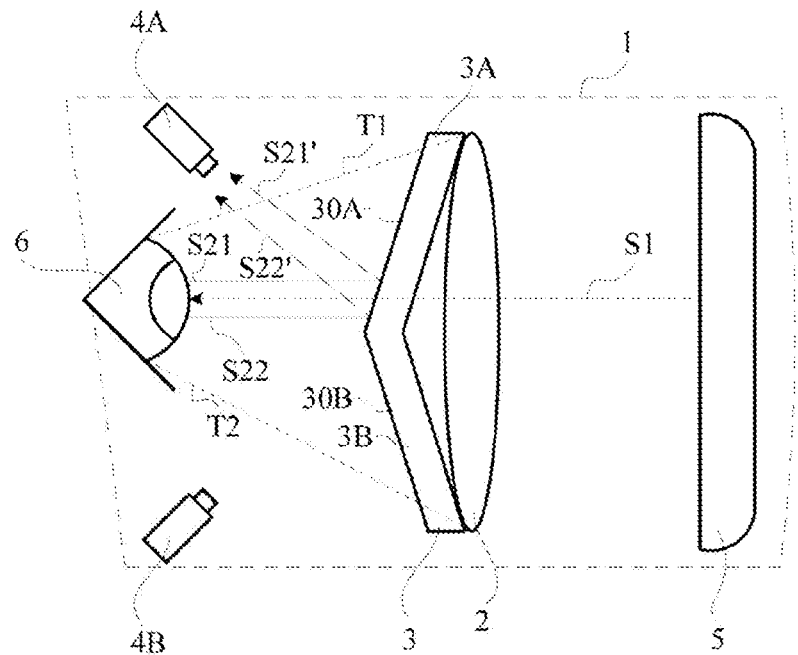

In some embodiments, the eye 6 may shift upward, as shown in FIG. 5. The first infrared ray S21 and the second infrared ray S22 may both be emitted towards the upper lens structure 3A and reflected by the upper lens surface 30A of the upper lens structure 3A to form the first reflected infrared ray S21' and the second reflected infrared ray S22', respectively. The first camera 4A may acquire the first reflected infrared ray S21' and the second reflected infrared ray S22', and combine them to form the infrared image of the eye 6.

Figure 6:
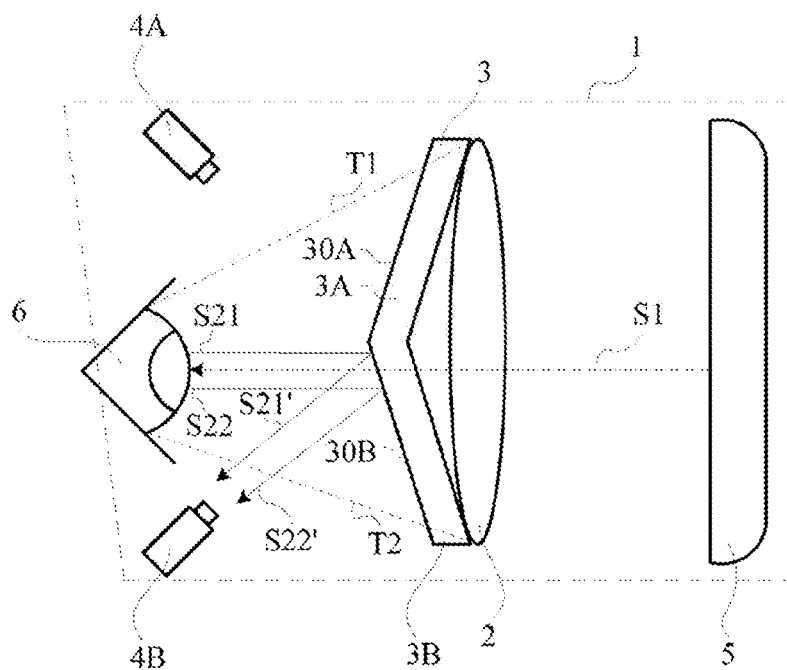

In some embodiments, the eye 6 may shift downward, as shown in FIG. 6. The first infrared ray S21 and the second infrared ray S22 may both be emitted towards the lower lens structure 3B and reflected by the lower lens surface 30B of the lower lens structure 3B to form the first reflected infrared ray S21' and the second reflected infrared ray S22', respectively. The second camera 4B may acquire the first reflected infrared ray S21' and the second reflected infrared ray S22', and combine them to form the infrared image of the eye 6.

In one embodiment, the upper lens structure 3A and the lower lens structure 3B of the partial-reflection partial-transmission lens 3 shown in FIGS. 4-6 may be symmetrical with respect to a horizontal plane going through the middle of the partial-reflection partial-transmission lens 3, such that the upper lens structure 3A and the lower lens structure 3B have the same or similar structural strength and stability, and the partial-reflection partial-transmission lens 3 may have better overall stability. In some embodiments, the upper lens structure 3A and the lower lens structure 3B may have an asymmetric structure. For example, a larger lower lens structure 3B may be used for the acquisition of an infrared image of an eye in most cases, and a smaller upper lens structure 3A may be employed to for the acquisition of an infrared image of an eye in rare cases where the eye 6 of the user is shifted upward. In that case, a joint of the upper lens structure 3A and the lower lens structure 3B may be located at an upper part of the partial-reflection partial-transmission lens 3.

Figure 7:
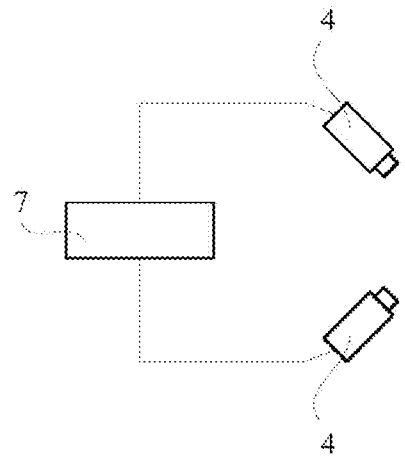
FIG. 7 is a schematic view of controlling an angle of a camera in accordance with one embodiment of this application.

In some embodiments, as shown in FIG. 7, the VR head-mounted apparatus of this application may further include an adjustment component 7. The adjustment component 7 may be electrically connected to each camera 4 to perform angle adjustment on the camera 4, so that the lens of the camera 4 is kept towards a virtual infrared image of the eye formed by the partial-reflection partial-transmission lens 3, thereby obtaining a complete, clear and accurate infrared image of the eye.

Figure 8:
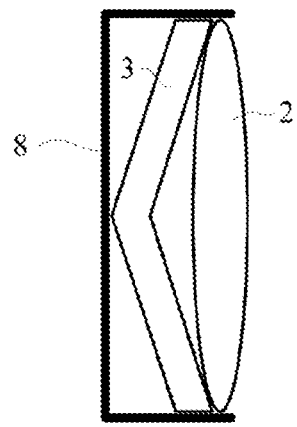
FIG. 8 is a schematic view of a partial-reflection partial-transmission lens and a convex lens along with a protective frame in accordance with one embodiment of this application.

Additionally, the VR head-mounted apparatus of this application may further include a protective frame 8, as shown in FIG. 8. The protective frame 8 may form an accommodating space adapted to the partial-reflection partial-transmission lens 3 and the convex lens 2, so as to accommodate and fix the partial-reflection partial-transmission lens 3 and the convex lens 2. The protective frame 8 improves the structural integrity and stability of the VR head-mounted apparatus.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . " does not exclude other same elements in the process, method, article or device which include the element.

References are made in detail to exemplary embodiments, examples of which are illustrated in the accompanying drawings. The above description refers to the accompanying drawings in which the same numbers in different drawings represent the same or similar elements unless otherwise represented. The implementations set forth in the following description of exemplary embodiments do not represent all implementations consistent with this application. Instead, they are merely examples of apparatuses and methods consistent with aspects related to this application as recited in the appended claims.

The terms used in this application are merely for the purpose of describing specific embodiments, and are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items.

It should be understood that although the terms such as first, second, and third may be used herein to describe various information, such information should not be limited to these terms. These terms are merely used for distinguishing information of the same type from each other. For example, within the scope of this application, first information may also be referred to as second information, and similarly, second information may also be referred to as first information. Depending on the context, the term "if" as used herein may be interpreted as "when . . . " or "upon . . . " or "in response to determining."

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A virtual reality (VR) head-mounted apparatus, comprising:
   a convex lens;
   a first camera located at a top of the VR head-mounted apparatus;
   a second camera located at a bottom of the VR head-mounted apparatus; and
   a partial-reflection partial-transmission wedge for reflecting infrared light, wherein the partial-reflection partial-transmission wedge is located on a side of the convex lens towards a user when the user wears the VR head-mounted apparatus, wherein the partial-reflection partial-transmission wedge comprises an upper structure and a lower structure connected at a joint of the upper structure and the lower structure, the upper structure and the lower structure contacting the convex lens, the upper structure having an upper-front surface facing towards the user and an upper-back surface facing away from the user, the upper-front surface configured to reflect a light from the user towards the first camera, the upper-front surface being a surface of the upper structure closest to the user, the upper-back surface being a surface of the upper structure closest to the convex lens, the upper-front surface substantially parallel with the upper-back surface, the lower structure having a lower-front surface facing towards the user and a lower-back surface facing away from the user, the lower-front surface configured to reflect the light from the user towards the second camera, the lower-front surface being a surface of the lower structure closest to the user, the lower-back surface being a surface of the lower structure closest to the convex lens, and the lower-front surface substantially parallel with the lower-back surface, wherein the upper-front surface and the lower-front surface are planar surfaces, the upper-front surface and the lower-front surface form a first obtuse angle at the joint of the upper structure and the lower structure, the upper-back surface of the upper structure and the lower-back surface of the lower structure forming a second obtuse angle at the joint of the upper structure and the lower structure.

2. The apparatus of claim 1, wherein the partial-reflection partial-transmission wedge has a higher transmittance for visible light than for infrared light.

3. The apparatus of claim 1, wherein the partial-reflection partial-transmission wedge comprises an infrared dichroic mirror.

4. The apparatus of claim 3, wherein the infrared dichroic mirror comprises a $TiO_2$—Ag—$TiO_2$ infrared reflective film or a ZnS—Ag—ZnS infrared reflective film.

5. The apparatus of claim 1, wherein the first camera is located outside a visible area of the convex lens with respect to the user.

6. The apparatus of claim 1, wherein the joint of the upper structure and the lower structure is located in the middle of the partial-reflection partial-transmission wedge.

7. The apparatus of claim 6, wherein the upper structure and the lower structure are symmetrical with respect to a horizontal plane going through the middle of the partial-reflection partial-transmission wedge.

8. The apparatus of claim 1, wherein the joint of the upper structure and the lower structure is located at an upper part of the partial-reflection partial-transmission wedge.

9. The apparatus of claim 1, further comprising:
a protective frame, which forms an accommodating space adapted to the partial-reflection partial-transmission wedge and the convex lens, so as to accommodate and fix the partial-reflection partial-transmission wedge and the convex lens to the apparatus.

10. The apparatus of claim 1, further comprising:
an adjustment component configured to perform angle adjustment on the first camera, such that a lens of the first camera is kept towards a virtual infrared image of the eye formed by the partial-reflection partial-transmission wedge.

11. A virtual reality (VR) apparatus, comprising:
a convex lens;
a first camera located at a top of the VR apparatus;
a second camera located at a bottom of the VR apparatus;
a partial-reflection partial-transmission wedge for reflecting infrared light, wherein the partial-reflection partial-transmission wedge is located on a side of the convex lens towards a user when the user wears the VR apparatus, wherein the partial-reflection partial-transmission wedge comprises an upper structure and a lower structure connected at a joint of the upper structure and the lower structure, the upper structure and the lower structure contacting the convex lens, the upper structure having an upper-front surface facing towards the user and an upper-back surface facing away from the user, the upper-front surface configured to reflect a light from the user towards the first camera, the upper-front surface being a surface of the upper structure closest to the user, the upper-back surface being a surface of the upper structure closest to the convex lens, the upper-front surface substantially parallel with the upper-back surface, the lower structure having a lower-front surface facing towards the user and a lower-back surface facing away from the user, the lower-front surface configured to reflect the light from the user towards the second camera, the lower-front surface being a surface of the lower structure closest to the user, the lower-back surface being a surface of the lower structure closest to the convex lens, the lower-front surface substantially parallel with the lower-back surface, wherein the upper-front surface and the lower-front surface are planar surfaces, the upper-front surface and the lower-front surface form a first obtuse angle at the joint of the upper structure and the lower structure, the upper-back surface of the upper structure and the lower-back surface of the lower structure forming a second obtuse angle at the joint of the upper structure and the lower structure; and a VR playing component on a side of the convex lens away from the user and configured to display VR content.

12. The apparatus of claim 11, wherein the VR playing component is a mobile phone or a tablet, and the VR content is displayed through a screen of the VR playing component.

13. The apparatus of claim 11, wherein the VR playing component is a display component connected to an external apparatus, which generates the VR content for the VR playing component to display.

14. The apparatus of claim 13, wherein the external apparatus is a personal computer or a game console.

15. The apparatus of claim 11, wherein the partial-reflection partial-transmission wedge has a higher transmittance for visible light than for infrared light.

16. The apparatus of claim 11, the partial-reflection partial-transmission wedge comprises an infrared dichroic mirror.

17. The apparatus of claim 16, wherein the infrared dichroic mirror comprises a $TiO_2$—Ag—$TiO_2$ infrared reflective film or a ZnS—Ag—ZnS infrared reflective film.

18. The apparatus of claim 11, wherein the first camera is located outside a visible area of the convex lens with respect to the user.

19. The apparatus of claim 11, wherein the joint of the upper structure and the lower structure is located in the middle of the partial-reflection partial-transmission wedge.

20. The apparatus of claim 11, further comprising:

an adjustment component configured to perform angle adjustment on the first camera, such that a lens of the first camera is kept towards a virtual infrared image of the eye formed by the partial-reflection partial-transmission wedge.

* * * * *